(12) United States Patent
Lee et al.

(10) Patent No.: US 9,287,748 B2
(45) Date of Patent: Mar. 15, 2016

(54) SPINDLE MOTOR

(75) Inventors: Jong Hoon Lee, Incheon (KR); Chang Seob Song, Seoul (KR)

(73) Assignee: SAMHONGSA CO., LTD. (KR)

( * ) Notice: Subject to any disclaimer, the term of this patent is extended or adjusted under 35 U.S.C. 154(b) by 356 days.

(21) Appl. No.: 13/977,184

(22) PCT Filed: Jan. 5, 2012

(86) PCT No.: PCT/KR2012/000120
§ 371 (c)(1),
(2), (4) Date: Jun. 28, 2013

(87) PCT Pub. No.: WO2012/093870
PCT Pub. Date: Jul. 12, 2012

(65) Prior Publication Data
US 2013/0278085 A1    Oct. 24, 2013

(30) Foreign Application Priority Data
Jan. 5, 2011 (KR) .......................... 10-2011-0000827

(51) Int. Cl.
*H02K 7/08* (2006.01)
*H02K 5/167* (2006.01)
*G11B 19/20* (2006.01)

(52) U.S. Cl.
CPC .............. *H02K 7/08* (2013.01); *G11B 19/2036* (2013.01); *H02K 5/167* (2013.01); *H02K 5/1675* (2013.01)

(58) Field of Classification Search
None
See application file for complete search history.

(56) References Cited

U.S. PATENT DOCUMENTS

| | | | |
|---|---|---|---|
| 4,523,800 A | * | 6/1985 | Yamashita et al. .......... 359/200.1 |
| 5,541,462 A | * | 7/1996 | Nii et al. .......................... 310/90 |
| 2006/0098907 A1 | * | 5/2006 | Hayashi et al. ............... 384/121 |
| 2009/0021087 A1 | * | 1/2009 | Kitamura et al. ............... 310/43 |

FOREIGN PATENT DOCUMENTS

| | | |
|---|---|---|
| JP | 2009204019 | 9/2009 |
| KR | 1020090041935 | 4/2009 |
| KR | 1020100035999 | 4/2010 |
| KR | 1020100043525 | 4/2010 |
| KR | 1020100064847 | 6/2010 |
| WO | 2010140840 | 12/2010 |

OTHER PUBLICATIONS

International Search Report—PCT/KR2012/000120 dated Sep. 19, 2012.

* cited by examiner

*Primary Examiner* — Tran Nguyen
(74) *Attorney, Agent, or Firm* — Cantor Colburn LLP (57) ABSTRACT

A spindle motor includes: a rotor; a rotating shaft whose one end is combined with the rotor; a sleeve bearing whose inner circumference rotatably supports the outer circumferential surface of the rotating shaft, and on the outer circumferential surface of which at least one oil circulation recess is provided along the lengthy direction of the sleeve bearing; a bearing housing having a first recess accommodating the sleeve bearing and a second recess that supports the other end of the rotating shaft at a central portion of the first recess, and made of a resin; and a number of protrusions that are protrudingly formed at a gap radially spaced apart from each other around the rotating shaft so that a plurality of guide grooves through which oil passes are formed on the bottom of the first recess, and on which the bottom of the sleeve bearing is mounted.

7 Claims, 5 Drawing Sheets

SPINDLE MOTOR

TECHNICAL FIELD

The present invention relates to a spindle motor, and more particularly to, a high-speed rotating spindle motor in which a resin is used to form a bearing housing, and thus a bearing is mounted in a uniform and stable posture on the bottom of the bearing housing when the bearing is press-fitted into the bearing housing, to thereby secure verticality of a rotating shaft and achieve a smooth circulation of oil without any congestion regions of oil on an oil path taking place in the bearing housing.

BACKGROUND ART

Typically, optical disc players such as LDPs, CDPs, CD-ROM and DVD-ROM players, DVD players, and BD and 3D players, are apparatuses including operations of: loading a disc onto a turntable by a loading mechanism; clamping, fitting and fixing a mounting hole formed at the center of the disc with a chuck that is a clamping unit; rotating the disc clamped in the chuck in one direction by a drive source of a spindle motor drive unit; and reproducing information recorded on the disc by an optical pickup unit that moves in a radial direction of the disc.

In general, the spindle motor maintains a constant contact section between the bearing and the rotating shaft, to thereby rotatably support the rotating shaft and to thus maintain high accuracy rotational characteristics, with a result of being widely employed as a driving unit for driving a hard disc drive (HDD), optical disc drive (ODD) and other recording media requiring high-speed rotation.

Figure 1:
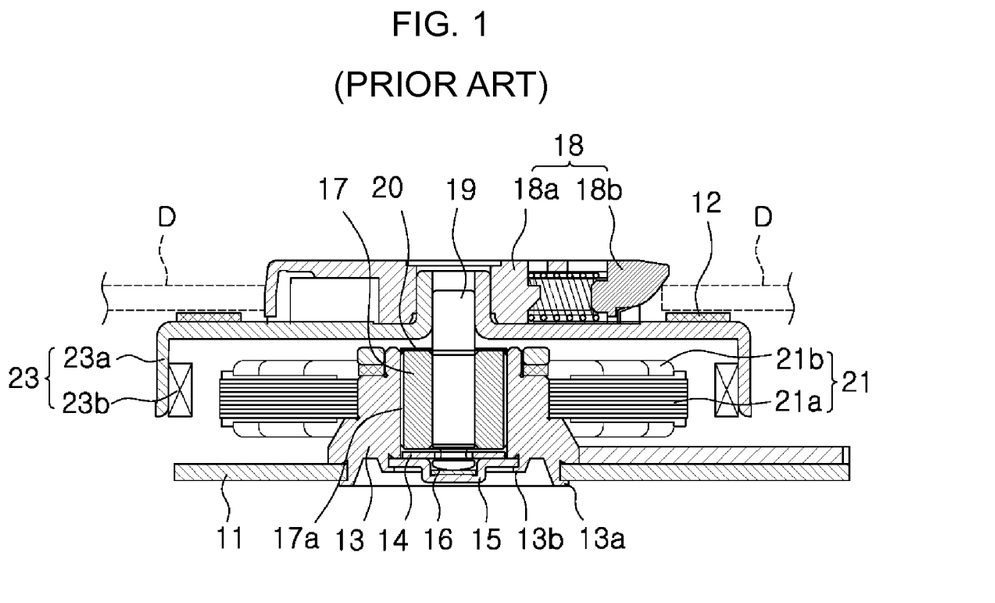
FIG. 1 is a cross-sectional view showing a conventional spindle motor in axial section.

The spindle motor requiring high-speed rotation becomes thinner and lighter to meet development of ever-smaller electronic devices, and an example of the spindle motor is schematically shown in FIG. 1 (see Korean Laid-open Patent Publication No. 10-2010-0043525).

FIG. 1 is a cross-sectional view of a conventional spindle motor. As shown, the conventional spindle motor is combined by inserting an outer circumferential surface of the lower end of a bearing housing 13 into a coupling hole formed in a base plate 11 to thus spinning or caulking an outer projection 13a. Slit washers 14 and a cap 15 are coupled on an inner circumferential surface of the lower end of the bearing housing 13, in order to prevent a rotating shaft 19 from seceding, in which the cap 15 is combined by spinning or caulking an inner projection 13b of the lower end of the bearing housing 13.

A sleeve bearing 17 is fixed in the bearing housing 13 and the rotating shaft 19 is supported by the sleeve bearing 17, in which the rotating shaft 19 is rotatably supported by the sleeve bearing 17. A support washer 16 that is provided in the lower end of the rotating shaft 19 to reduce a rotational resistance of the rotating shaft 19 is disposed in the cap 15.

In this case, the sleeve bearing 17 is sintered to thus be formed of a porous material having a large number of pores therein. Here, oil is leaked from the pores during rotation of the rotating shaft 19 by impregnating the pores with oil. Accordingly, an oil film is formed between the bearing sleeve 17 and the rotating shaft 19, to thus minimize the friction therebetween.

Figure 2:
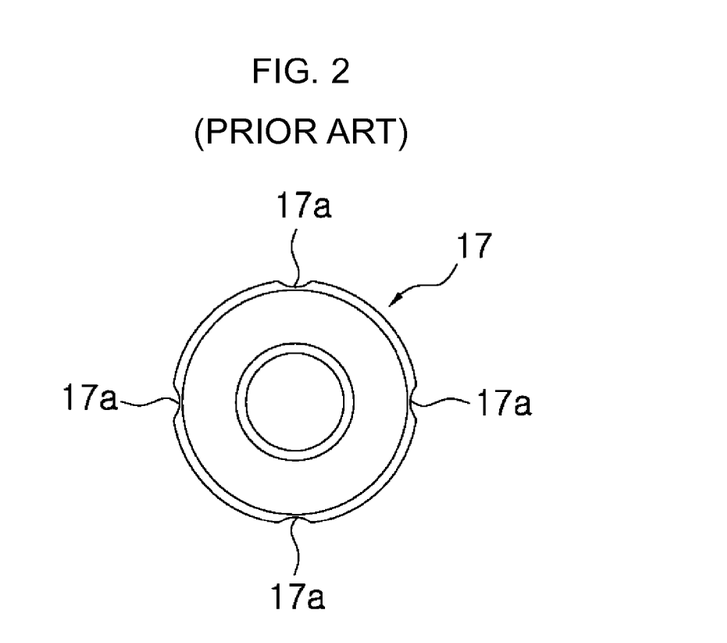
FIG. 2 is a plan view showing a sleeve bearing shown in FIG. 1.

The oil is circulated along a path of rising up along between the sleeve bearings 17 and the rotating shaft 19, and then falling down along four recesses 17a (see FIG. 2) that are formed on the outer circumference of the sleeve bearing 17 through an oil shatter-proof washer 20 for preventing oil from scattering.

In addition, a stator 21 having a core 21a and a coil 21b is fixed on the outer circumferential surface of the bearing housing 13, and a rotor 23 having a rotor yoke 23a and a magnet 23b is fixed on the leading end of the rotating shaft 19.

The upper surface of the rotor yoke 23a of the rotor 23 plays a role of a turntable on which a disc D storing data is secured and seated. To this end, a rubber ring 12 is arranged on the outside of the upper surface of the rotor yoke 23a to thus prevent the disc D from slitting, and a chucking device 18 having a disc chuck 18b and a chuck case 18a is provided on the inside of the upper surface of the rotor yoke 23a to thus secure the disc D.

The conventional spindle motor generates a rotating magnetic field when an electric current is supplied to the coil 21b, and thus the magnet 23b, that is, the rotor 23 rotates by an electromagnetic force 23b is formed between the coil 21b and the magnet 23b, to thus enable the disc D mounted on the rotor yoke 23a to rotate.

The conventional spindle motor is configured to have a predetermined gap (or space) between the bottom of the sleeve bearing 17 and the slit washers 14 so that oil smoothly passes between the sleeve bearing 17 and the slit washers 14 at the time when the sleeve bearing 17 is press-fitted into the bearing housing 13, taking the oil circulation path between the sleeve bearing 17 and the rotating shaft 19 into consideration.

Figure 3:
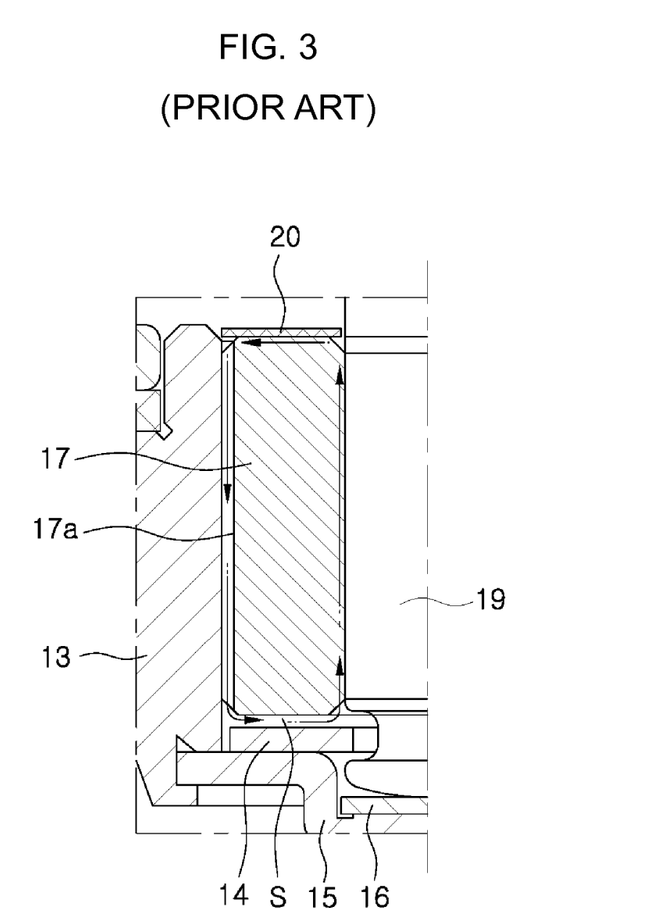
FIG. 3 is an enlarged cross-sectional view representing an oil circulation path of a conventional spindle motor.

Referring to FIG. 3, the oil circulation path of the conventional spindle motor will be described below. First, oil rises up along between the sleeve bearings 17 and the rotating shaft 19, and then moves to the outside of the sleeve bearing 17 along between the upper end of the sleeve bearing 17 and the oil shatter-proof washer 20. Sequentially, oil continues to flow down along the recess 17a of the sleeve bearing 17, and then moves toward the bottom of the rotating shaft 19, along a space S formed between the slit washers 14 and the bottom of the sleeve bearing 17.

However, in order to prepare the predetermined space S through which oil passes between the bottom of the sleeve bearing 17 and the slit washers 14, a press-fitting force is appropriately controlled when the sleeve bearings 17 is press-fitted into the bearing housing 13, lest the sleeve bearing 17 should be fully in contact with the slit washers 14.

Accordingly, when the sleeve bearing 17 is press-fitted into the bearing housing 13, the press-fitting force and direction have a huge impact on verticality and wobble. In other words, since the rotating shaft 19 that is inserted into and coupled with the sleeve bearing 17 is not vertical unless the sleeve bearing 17 is vertically assembled with the bearing housing 13, the rotating shaft 19 may be eccentrically rotated to thus cause vibration and noise to occur.

Moreover, when the sleeve bearing 17 is press-fitted into the bearing housing 13, an inner diameter portion of the sleeve bearing 17 may change by the press-fitting force. As a result, in order to correct the change in the inner diameter portion of the sleeve bearing 17, machining of the inner diameter portion of the sleeve bearing 17 is required by a sizing process.

In addition, when a spinning or coking process is executed in order to perform a bonding process between the bearing housing 13 and each of the base plate 11 and the cap 15, a verticality of the bearing housing 13 with respect to the base plate 11 will occur. As a result, when the sleeve bearing 17 is press-fitted into the bearing housing 13, a run-out problem from the verticality of the sleeve bearing 17 may occur to accordingly require a repair the run-out problem. In this case, if the rotating shaft 19 is assembled with the bearing 17 without repairing, the rotating shaft 19 is tilted from the base plate 11, and thus vibration and noise may occur.

In addition, when a spinning or caulking process of joining the cap 15 to the bearing housing 13 is poor, oil of the sleeve bearing 17 may leak through a contact area between the bearing housing 13 and the cap 15.

In addition, since the coupling between the bearing housing 13 and the base plate 11 and the coupling between the bearing housing 13 and the cap 15 are accomplished by a spinning or caulking process of the outer and inner projections 13a and 13b, an assembly process becomes complicated.

DISCLOSURE

Technical Problem

To solve the above problems or defects, it is an object of the present invention to provide a spindle motor in which protrusions having an oil guide pattern are formed on the bottom of a bearing housing to thereby make a sleeve bearing fully closely contact the protrusions together with slit washers when the sleeve bearing is press-fitted into the bearing housing, and to thus induce oil to smoothly circulate, as well as secure a verticality of a rotating shaft and minimize vibration.

It is another object of the present invention to provide a spindle motor in which since strength of a bearing is larger than that of a bearing housing when the bearing is press-fitted into the bearing housing, an inner diameter portion of the bearing does not change and thus a sizing process of the bearing is not required.

It is still another object of the present invention to provide a spindle motor in which a resin is used to form a bearing housing, and a resin is also used to form a bearing housing, simultaneously integrate a base plate with the bearing housing in an insert molding method, a hot melt adhering method, or a bonding method, to thereby secure verticalities of a sleeve bearing and a rotating shaft, and promote reduction of a manufacturing cost and efficiency of a manufacturing process.

It is yet another object of the present invention to provide a motor in which a support washer and a cap are integrally formed together with a bearing housing when the bearing housing is formed, to thereby reduce assembly components, and improve a verticality of a rotating shaft and to thus reduce vibration and noise as well as to thus prevent oil leakage of a bearing.

It is a further object of the present invention to provide a motor in which a fixed-type housing is molded by integrating a base plate with a bearing housing in an identical material, to thereby enhance reduction of a manufacturing cost and a verticality of a rotating shaft, and to thus reduce vibration and noise, and to thereby prevent skew of the rotating shaft or the bearing, and to thus ensure more stable driving characteristics and promote lighter and thinner implementation.

The objects of the present invention are not limited to the above-described objects, and other objects and advantages of the present invention can be appreciated by the following description and will be understood more clearly by embodiment of the present invention. In addition, it will be appreciated that the objects and advantages of the present invention will be easily realized by means shown in the appended patent claims, and combinations thereof.

Technical Solution

To accomplish the above and other objects of the present invention, according to an aspect of the present invention, there is provided a spindle motor comprising: a rotor; a rotating shaft whose one end is combined with the rotor; a sleeve bearing whose inner circumference rotatably supports the outer circumferential surface of the rotating shaft, and on the outer circumferential surface of which at least one oil circulation recess is provided along the lengthy direction of the sleeve bearing, and that is made of an oil-containing sintered metal; a bearing housing having a first recess accommodating the sleeve bearing and a second recess that supports the other end of the rotating shaft at a central portion of the first recess, and made of a resin; a number of protrusions that are protrudingly formed at a gap radially spaced apart from each other around the rotating shaft so that a plurality of guide grooves through which oil passes are formed on the bottom of the first recess, and on which the bottom of the sleeve bearing is mounted; slit washers that are provided so as to closely contact the bottom of the sleeve bearing between the sleeve bearing and the protrusions, and that prevent the rotating shaft of the rotor from seceding from the sleeve bearing; a stator that is coupled with an outer diameter portion of the bearing housing so as to face the rotor, and that generates an electromagnetic field when a drive signal is applied to the stator, to thereby rotationally drive the rotor; and a base plate whose outer circumference is extended from the bottom of the bearing housing, and on the upper surface of which a printed circuit board (PCB) for a drive circuit that applies a drive signal to the stator is mounted, and that is fixed to a disc drive unit.

Preferably but not necessarily, the base plate is integrally formed with the bearing housing by using a resin.

Preferably but not necessarily, the bearing housing is injection molded by using a resin, and is integrated with the base plate by an insert molding method, or is integrated with the base plate by hot melt adhering or bonding the base plate onto the injection molded bearing housing.

Preferably but not necessarily, the bearing housing comprises at least one empty space.

Preferably but not necessarily, the base plate comprises: a flat plate on the upper surface of which a printed circuit board (PCB) is mounted; and an extension portion that is embedded in the bearing housing, and that is extended from the flat plate in order to increase a binding force with the bearing housing, in which a through-hole is formed at the center of the extension portion.

Preferably but not necessarily, the spindle motor further comprises a plurality of protrusions that are protruded toward the central direction of the through-hole of the extension portion.

Preferably but not necessarily, the spindle motor further comprises a thrust magnet that is coupled to an outer diameter portion on the uppermost end of the bearing housing, to thereby suppress the rotor to rise in the axial direction during high-speed rotation of the rotor, wherein the bearing housing is hot melt adhered with a stopper that is placed in the upper side of the thrust magnet so that the thrust magnet does not secede from the bearing housing.

Preferably but not necessarily, the spindle motor further comprises an oil shatter-proof washer that is coupled to an inlet of the first recess of the bearing housing at the upper side of the bearing, for preventing oil in the bearing from being scattered to the outside of the bearing.

Preferably but not necessarily, the rotor is coupled with the stator in an outer rotor type, and the rotor further comprises a chucking device that is placed on the upper surface of a rotor case in order to fix a disc.

Advantageous Effects

As described above, according to the present invention, a spindle motor is configured to form protrusions having an oil guide pattern on the bottom of a bearing housing, to thereby make a sleeve bearing fully closely contact the protrusions together with slit washers when the sleeve bearing is press-fitted into the bearing housing, and to thus induce oil to smoothly circulate, as well as secure a verticality of a rotating shaft and minimize vibration.

In addition, in the spindle motor according to the present invention, since strength of a bearing is larger than that of a bearing housing when the bearing is press-fitted into the bearing housing, an inner diameter portion of the bearing does not change and thus a sizing process of the bearing is not required.

In addition, in the spindle motor according to the present invention, a resin is used to form a bearing housing, and to simultaneously integrate a base plate with the bearing housing in an insert molding method, or insert injection molding method, to thereby secure verticalities of a sleeve bearing and a rotating shaft that are assembled with the base plate, and promote reduction of a manufacturing cost and efficiency of a manufacturing process.

In addition, in the spindle motor according to the present invention, a support washer and a cap are integrally formed together with a bearing housing when the bearing housing is formed, to thereby reduce assembly components, and improve a verticality of a rotating shaft and to thus reduce vibration and noise as well as to thus prevent oil leakage of a bearing and to thus enhance an assembly of components and reduce a manufacturing cost.

BEST MODE

Hereinafter, a spindle motor according to a preferred embodiment of the present invention will be described in detail with reference to the accompanying drawings.

First, the present invention can be applied to low-speed rotating motors as well as spindle motors requiring high-speed rotation, and applied to both brushless DC motors and brush-type DC motors. An embodiment of the present invention will be described below with an example of a preferred embodiment that is applied to a BLDC type spindle motor, for example.

Referring to FIGS. 4 to 7, an ultra-thin spindle motor 100 according to a preferred embodiment of the present invention includes a stator (or an armature) 140 and a rotor 180 of an outer rotor type.

Figure 4:
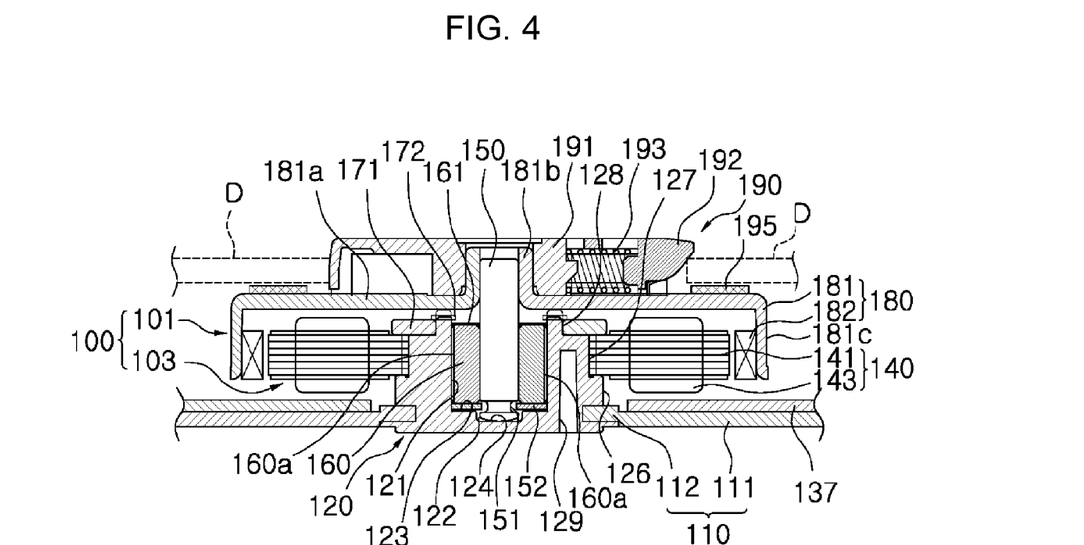
FIG. 4 is a cross-sectional view showing a spindle motor according to an embodiment of the present invention in axial section.

The stator 140 has a structure having a core 141 including a plurality of radially projecting teeth and a coil 143 that is wound on the core 141.

The rotor 180 includes an inverted cup-shaped rotor case 181 and a ring-shaped magnet 182 where a plurality of N-pole and S-pole magnets are alternately arranged or a plurality of N-pole and S-pole are split and magnetized. In this case, the rotor case 181 is preferably made of a material for forming a magnetic path that can prevent the rotor 190 from rising and flowing in an axial direction during rotation of the rotor 180, by a mutual attracting action with a thrust magnet 171 to be describe later due to a magnetic force of the thrust magnet 171 together with a role of a back yoke for the ring-shaped magnet 182. In this case, the thrust magnet 171 is fixed on the outer circumference of the bearing housing 120 by a stopper 172 that is fixed on top of the bearing housing 120 in a hot melt adhering method.

The rotor case 181 includes: a circular cover plate 181a that plays a role of a turntable on which a disc D storing data, that is, a recording medium is secured and seated; a downward bent portion 181c that is bent downward from the leading end of the cover plate so as to face the outer circumference of the stator 140 and on the inner circumferential surface of which a magnet 182 is attached; and an upward bent portion 181b that is protruded upward so as to be stably coupled with a rotating shaft 150 to be described later at the central portion of the cover plate.

A disc support 195 made of a rubber ring to prevent a disc D from slitting is arranged on the outside of the upper surface of the circular cover plate 181a, and a chucking device 190 having a plurality of disc chucks 192 for elastically supporting a leading end of the disc D by a spring 193 to fix the disc D to be loaded, and a circular chuck case 191 for supporting the chucks is arranged on the inside of the upper surface of the circular cover plate 181a. The central portion of the chuck case 191 is coupled with and supported by the upward bent portion 181b of the rotor case 181.

The spindle motor 100 as constructive above generates a rotating magnetic field when an electric current is supplied to the coil 143 of the stator 140, and thus the magnet 182, that is, the rotor 23 is rotated by an electromagnetic force formed between the coil 143 and the magnet 182, to thereby cause rotation of the disc D mounted on the rotor case 181.

Meanwhile, the spindle motor 100 according to the present invention includes a rotating body 101 having the rotor 180 and the chucking device 190 and on the central portion of which a rotating shaft 150 is combined, and a fixed body 103 that rotatably supports the rotating shaft 150 combined on the central portion of the rotating body 101.

The stator 140 is combined on the upper side of the outer circumference of the fixed body 103, and the base plate or a bracket 110 is integrally combined on the bottom of the outer circumference of the fixed body 103. The fixed body 103 includes the bearing housing 120 in which the sleeve bearing 160 is combined into the first recess 121 formed on the inner circumference of the bearing housing 120. The rotating shaft 150 combined on the center of the rotating body 101 is rotatably supported by the sleeve bearing 160.

Figure 5:
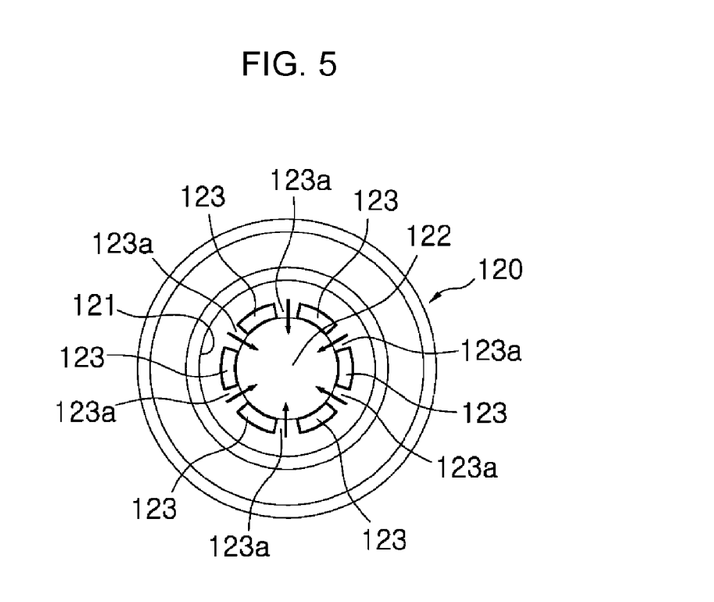
FIG. 5 is a plan view showing a base plate shown in FIG. 4.

The base plate 110 fixedly supports the fixed body 103 as a whole, and may be fabricated in various shapes so that the base plate 110 may be fixedly mounted on a variety of disc drive devices on which the spindle motor 100 is mounted. The base plate 110 includes holes 115 with which a number of screws or bolts are coupled.

In addition, the base plate 110 is placed on the lower side of the stator 140, and further includes at least one fixing hole 119 for fixing a printed circuit board (PCB) 137 that applies a drive signal to the stator 140 in a caulking method or the like. The drive signal for controlling the spindle motor 100 is applied to the printed circuit board (PCB) 137 from the main body of the disc drive device, for example, through a flexible flat cable (FFC).

Moreover, the base plate 110 may be preferably mainly made of lightweight materials such as aluminum or aluminum alloys, or iron-based alloys, but may be made of other metal materials or synthetic resins.

In this case, the base plate 110 is integrally formed with the bearing housing 120, in an insert injection method or insert molding method, at the time of making the bearing housing 120 that is injection molded by using, for example, a thermoplastic or thermosetting resin. In addition, in the case that the base plate 110 is made of a synthetic resin, the base plate 110 is integrally formed with the bearing housing 120 during injection molding the bearing housing 120.

Figure 6:
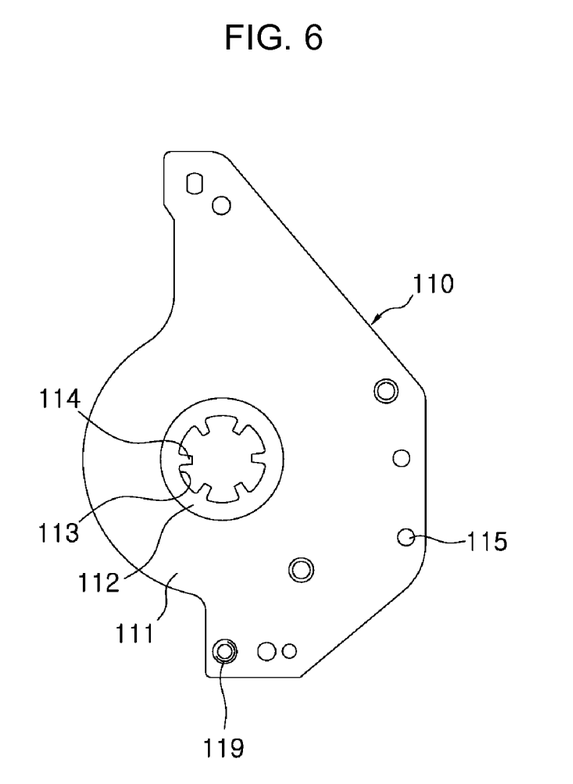
FIG. 6 is a plan view showing protrusions an oil guide pattern formed on the bottom of a bearing housing shown in FIG. 4.

For this purpose, referring to FIGS. 5 and 6, the base plate 110 includes: a flat plate 111; and an extension portion 112 that is bent upward from the flat plate 111 and then is extended and molded in parallel with the flat plate 111 in order to increase a binding force with the bearing housing 120. The extension portion 112 includes a number of, for example, six protrusions 114 that are protruded into a through-hole 113 formed at the center of the extension portion 112.

A part of the inner portion of the base plate 110 is embedded in a first outer diameter portion 126 on the lower end of the outer circumference of the bearing housing 120, according to an insert injection method or insert molding method during injection molding the bearing housing 120, and thus integrally formed with the bearing housing 120.

In addition, the bearing housing 120 is sequentially reduced in diameter stepwise from the first outer diameter portion 126, to thus form second and third outer diameter portions 127 and 128. The inner circumference of the stator 140 is combined on the outer circumference of the second outer diameter portion 127, so that the stator 140 is seated in a step portion between the first outer diameter portion 126 and the second outer diameter portion 127. A ring-shaped thrust magnet (or an attracting magnet) 171 for suppressing a rotor to be described later from rising in an axial direction during high-speed rotation is combined on the outer circumference of the third outer diameter portion 128, so that the thrust magnet 171 is seated in a step portion between the second outer diameter portion 127 and the third outer diameter portion 128.

Moreover, the sleeve bearing 160 is press-fitted into a first cylindrical recess 121 formed on the inner circumference of the bearing housing 120. A circular through-hole is provided at the central portion of the sleeve bearing 160. Accordingly, the rotating shaft 150 is rotatably coupled with the sleeve bearing 160.

In this case, the bottom of the rotating shaft 150 is inserted into the second recess 122 of the second diameter formed at the central portion of the first recess 121 and is supported on a bottom surface 124 of the second recess 122.

In addition, slit washers 152 whose inner side ends are inserted into the recessed portion 151 of the lower side of the rotating shaft 150, in order to suppress the rotating shaft 150 from seceding from the bearing 160, are respectively seated in protrusions 123 that are protruded on the bottom of the first recess 121 on the outskirts of the second recess 122.

The slit washers 152 are closely supported by the protrusions 123 that are protruded on the bottom of the first recess 121 in the bearing housing 120 by the sleeve bearing 160, when the sleeve bearing 160 is press-fitted into the inside of the bearing housing 120.

Referring to FIGS. 4 to 7, a number of the projections 123, that is, six protrusions 123 are radially formed on the basis of the center of the bearing housing 120 in which the rotating shaft 15 is mounted. A number of guide grooves 123a through which oil passes are formed at an identical interval between the protrusions 123. Accordingly, oil flowing down along a number of recesses 160a formed on the outer circumference of the sleeve bearing 160 may move naturally to the lower end of the rotating shaft 150 along the number of guide grooves 123a.

The sleeve bearing 160 may employ an oilless bearing, for example, an oil-containing sintered metal, and is made into a cylindrical shape. In other words, a metal bearing that is obtained by impregnating oil into a porous copper alloy such as a brass system may be used as the sleeve bearing 160.

An oil shatterproof washer 161 for preventing oil in the bearing from scattering is coupled at the entrance of the first recess 121 of the bearing housing 120 of the upper side of the bearing 160.

In this case, a plurality of recesses 160a are formed in parallel with the axial direction of the sleeve bearing 160 on the outer circumference of the sleeve bearing 160. The plurality of the recesses 160a guide the oil that has risen up along between the rotating shaft 150 and the sleeve bearing 160 not to rise up any more by the oil shatterproof washer 161 but to fall down along between the bearing housing 130 and the sleeve bearing 160.

The bearing housing 120 may be made by an injection molding method by using a thermosetting resin or a thermoplastic resin such as an engineering plastic material such as nylon 66 or polycarbonate (PC).

In this case, as shown in FIG. 4, it is desirable that the bearing housing 120 is formed to have at least one empty space 129, to thereby reduce a material cost and to reduce the weight.

In addition, in the case that the bearing housing 120 is molded by using an engineering plastic material such as nylon 66 or polycarbonate (PC), it is possible to omit a support washer or a thrust plate that has been required in the conventional case, in order to reduce frictional resistance of the rotating shaft 150.

In addition, according to the present invention, it is possible to additionally reduce the number of components by integrally forming the bearing housing 120 and a cap that supports the support washer or thrust plate.

An assembly method of the spindle motor 100 according to the present invention constructed as described above, will be described below.

First, the bearing housing 120 is molded by an insert injection method or an insert molding method, and simultaneously molded so that a part of the inner portion of the base plate 110 is embedded in the bearing housing 120, to thereby integrate the bearing housing 120 with the base plate 110.

Then, a printed circuit board (PCB) 137 that applies a drive signal to the stator 140 is fixed on the base plate 110 that is placed on the lower side of the stator 140, by using a caulking method or the like.

Thereafter, the slit washers 152 and the sleeve bearing 160 are sequentially press-fitted into the first recess 121 of the bearing housing 120. In this case, the sleeve bearing 160 is press-fitted so as to fully closely contact the slit washers 152 mounted on the protrusions 123. Accordingly, the lower end of the sleeve bearing 160 is stably seated as a whole by the projections 123 indirectly, to thereby secure a verticality of the rotating shaft 150 that is inserted into the sleeve bearing 160 later.

The sleeve bearing 160 has been inserted into the bearing housing 120 and then the oil shatter-proof washer 161 is press-fitted into the bearing housing 120 so as to be positioned on the upper side of the sleeve bearing 160, or fixed on the bearing housing 120 through a hot melt adhering method.

Subsequently, the pre-assembled stator 140 is press-fitted and coupled with the outer circumference of the second outer diameter portion 127 so as to be seated on a step portion between the first outer diameter portion 126 and the second outer diameter portion 127 in the bearing housing 120, and then is fixed thereon with an adhesive.

Furthermore, the thrust magnet 171 is coupled with the outer circumference of the third outer diameter portion 128 so as to be seated on a step portion between the second outer diameter portion 127 and the third outer diameter portion 128, and then is fixed thereon with an adhesive. In this case, the thrust magnet 171 may be disposed on the upper side of the stator 140 facing the cover plate 181a of the rotor case 181 playing a role of a back yoke, or on the bottom surface of the cover plate 181a of the rotor case 181 facing the core 141 of the stator 140, rather than the thrust magnet 171 is seated in a step portion between the second outer diameter portion 127 and the third outer diameter portion 128.

Thereafter, the chucking device 190 and the disc support 195 are coupled on the upper portion of the circular cover plate 181a of the pre-assembled rotor 180, and then one end of the rotating shaft 150 is press-fitted into the upward bent portion 181b of the rotor case 181, to thereby complete the rotating body 101.

Then, the other end of the rotating shaft 150 is inserted into the hollow portion of the bearing 160, and then combined until the bottom of the rotating shaft 150 passes through the slit washers 152 and contacts the bottom surface 124 of the second recess 122 in the bearing housing 120, to thereby complete the assembly of the rotating body 101.

Figure 7:
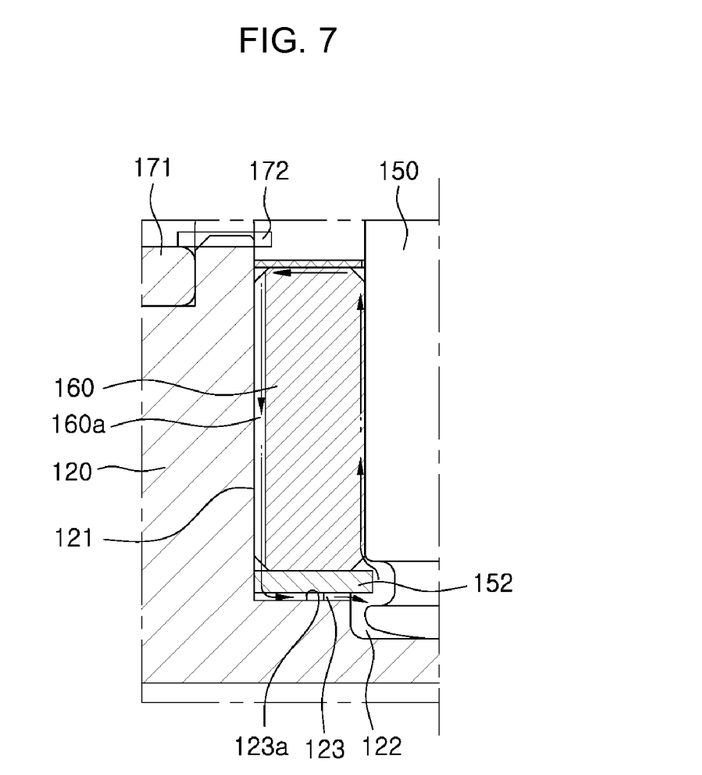
FIG. 7 is an enlarged cross-sectional view representing an oil circulation path of an ultra-slim spindle motor according to an embodiment of the present invention.

The spindle motor 100 assembled as described above, circulates oil in the bearing housing 120 as shown in FIG. 7, when the rotating body 101 is rotated at high speed, and minimizes friction between the rotating shaft 150 and the sleeve bearing 160.

In this case, oil that moves along the oil circulation path in the bearing housing 120, rises up along between the rotating shaft 150 and the sleeve bearing 160 from the second recess 124, and then moves along between the upper end of the sleeve bearing 160 and the oil shatterproof washer 161. Then, oil falls down along a plurality of recesses 160a on the outer circumference of the sleeve bearing 160, and then is collected again into the second recess 124 by which the lower end of the rotating shaft 150 is supported along the guide grooves 123a respectively formed between the protrusions 123.

The spindle motor 100 in accordance with an embodiment of the present invention may minimize the friction and wear between the rotating shaft 150 and sleeve bearing 160 since oil is smoothly circulated along the oil circulation path.

In addition, when the sleeve bearing 160 is press-fitted into the bearing housing 120, the lower end of the sleeve bearing 160 is stably seated on and indirectly supported by the protrusions 123 in the bearing housing 120, to thereby stably secure a verticality of the rotating shaft 150 and to thus prevent vibration and fluttering noise. Moreover, the present invention unaffects the verticality of the rotating shaft 150 due to the press-fitting direction and press-fitting force of the bearing 160 as in the conventional case, to thereby, as well as conventional bearings 160 of the indentation force to the indentation maintain a uniform assembly quality and ensure reliability of products.

Moreover, in the present invention, when the bearing 160 is press-fitted into and assembled with the bearing housing 120, the strength of the bearing 160 made of a metal material is larger than that of the bearing housing 120 made of a resin. Accordingly, the inner diameter portion of the bearing does not change and thus does not require a sizing process.

In addition, the spindle motor 100 according to the present invention is configured to have the bearing housing 120 by using a resin and simultaneously integrally forming a part of the base plate 110 with the bearing housing 120 by the insert molding or insert injection method, to thus sufficiently secure verticality of the assembled bearing 160 and rotating shaft 150. Therefore, in the present invention, the conventional spinning or caulking process for combining the bearing housing 120 and the base plate 110 may be removed, to thereby reduce a manufacturing cost and achieve efficiency of the assembly process.

In addition, in the present invention, when the bearing housing 120 is formed, the support washer and cap may be integrally formed with the bearing housing 120, to thereby reduce the number of the assembled components, and enhance verticality of the rotating shaft 150, and to thus reduce vibration and noise and to fundamentally prevent oil of the bearing 160 from leaking due to a poor assembly.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention may be applied to a high-speed rotating spindle motor in which a bearing is mounted in a uniform and stable posture on the bottom of a bearing housing when the bearing is press-fitted into the bearing housing, to thereby secure verticality of a rotating shaft and oil circulation guide grooves are provided on the bottom of the bearing housing, to thereby achieve a smooth circulation of oil without any congestion regions of oil on an oil path taking place in the bearing housing.

The invention claimed is:

1. A spindle motor comprising:
a rotor;
a rotating shaft whose one end is combined with the rotor;
a sleeve bearing having an inner circumference rotatably supporting an outer circumferential surface of the rotating shaft, wherein the rotating shaft includes at least one oil circulation recess formed on the outer circumferential surface thereof along a longitudinal direction of the sleeve bearing, and is made of an oil-containing sintered metal;
a bearing housing formed of a single solid body having a first recess accommodating the sleeve bearing and a second recess formed on a bottom of the first recess, the second recess having a closed bottom supporting the other end of the rotating shaft at a central portion of the first recess, the sleeve bearing resting on the bottom of the first recess;
a plurality of first protrusions that are protrudingly formed on the bottom of the first recess around the second recess, the first protrusions being formed annularly spaced apart from each other to form a plurality of guide grooves through which oil passes;
slit washers that are provided so as to closely contact the bottom of the sleeve bearing between the sleeve bearing and the first protrusions, and that prevent the rotating shaft of the rotor from seceding from the sleeve bearing;

a stator that is coupled with an outer diameter portion of the bearing housing so as to face the rotor, and that generates an electromagnetic field when a drive signal is applied to the stator, to thereby rotationally drive the rotor; and a base plate whose outer circumference is extended from the bottom of the bearing housing, wherein a printed circuit board (PCB) for a drive circuit that applies a drive signal to the stator is mounted on an upper surface of the base plate fixed to a disc drive unit, wherein the base plate comprises: a flat plate; an extension portion extended from the flat plate and embedded in the bearing housing, the extension portion having a through-hole formed at a center thereof; and a plurality of second protrusions protruded from the extension portion and toward a center of the through-hole in order to increase a binding force with the bearing housing.

2. The spindle motor according to claim 1, wherein the base plate is integrally formed with the bearing housing.

3. The spindle motor according to claim 1, wherein the bearing housing comprises at least one empty space.

4. The spindle motor according to claim 1, wherein the bearing housing is injection molded by a resin, and is integrated with the base plate by an insert molding method, or is integrated with the base plate by hot melt adhering or bonding the base plate onto the injection molded bearing housing.

5. The spindle motor according to claim 1, further comprising a thrust magnet that is coupled to an outer diameter portion on an uppermost end of the bearing housing, to thereby suppress the rotor to rise in an axial direction during high-speed rotation of the rotor, wherein a stopper is placed in an upper side of the thrust magnet so that the thrust magnet does not secede from the bearing housing to thereby be combined with the bearing housing.

6. The spindle motor according to claim 1, further comprising an oil shatter-proof washer that is coupled to an inlet of the first recess of the bearing housing at an upper side of the sleeve bearing, for preventing oil in the bearing from being scattered to outside of the bearing housing.

7. The spindle motor according to claim 1, wherein the rotor is coupled with the stator in an outer rotor type, and wherein the rotor further comprises a chucking device that is placed on an upper surface of a rotor case in order to fix a disc.

* * * * *